United States Patent [19]
Berglund

[11] Patent Number: 4,988,176
[45] Date of Patent: Jan. 29, 1991

[54] PROJECTION LENS

[75] Inventor: Stig Berglund, Stockholm, Sweden

[73] Assignee: Optica Nova Onab AB, Sweden

[21] Appl. No.: 400,376

[22] Filed: Aug. 30, 1989

[30] Foreign Application Priority Data

Sep. 15, 1988 [SE] Sweden ................. 8803253

[51] Int. Cl.$^5$ .............................. G02B 9/36
[52] U.S. Cl. ................................. 350/470
[58] Field of Search ...................... 350/470, 471

[56] References Cited

U.S. PATENT DOCUMENTS

| 657,820 | 9/1900 | Gray | 350/470 X |
| 660,202 | 10/1900 | Rudolph | 350/470 X |
| 2,206,382 | 7/1940 | Zimmermann | 350/470 X |
| 3,619,036 | 11/1971 | Baker | 350/470 |
| 3,695,750 | 10/1972 | Baker | 350/470 |
| 4,298,252 | 11/1981 | Doi et al. | 350/470 |

FOREIGN PATENT DOCUMENTS 2235652 7/1972 Fed. Rep. of Germany.
3443356 11/1984 Fed. Rep. of Germany.

Primary Examiner—Scott J. Sugarman
Attorney, Agent, or Firm—Ostrolenk, Faber, Gerb & Soffen

[57] ABSTRACT

A projection lens comprises four coaxial, spherical surfaces with lenses (1-4 of which, in the direction from the object side (14) to the picture side (15), the first lens (1) has a convex surface facing the object side, the second lens (2) and the third lens (3) are located close together and spaced from the first lens (1) and the fourth lens (4), and the fourth lens (4) has a convex surface (41) facing the picture side. The surface (11) of the first lens (1) facing the picture side is planar. The surfaces (21, 31) of the second (2) and third (3) lenses facing the picture side are also planar. The surfaces (20, 30) of the second (2) and third (3) lenses facing the object side are concave. The surface (40) of the fourth lens (4) facing the object side is preferably slightly convex but may even be planar. The lens is used eccentrically in relation to the optical axis (70) of a projector, preferably an overhead projector, in which the lens is located in the region above the end edge of an object window (14) situated in the projection direction, and in focus (61) of an elliptical mirror (6) illuminating the object window, in the other focus (60) of which a light source is located, the lens thus being slightly eccentric from said adjacent mirror focus (61) in the direction of the central axis of the object window (14).

6 Claims, 4 Drawing Sheets

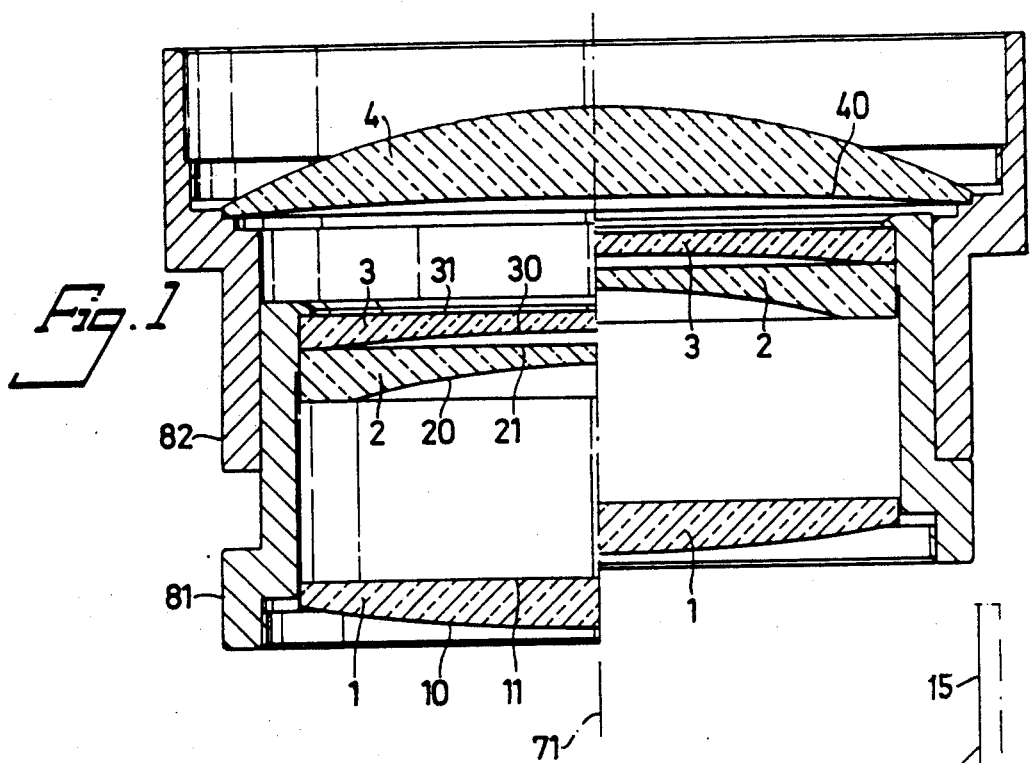
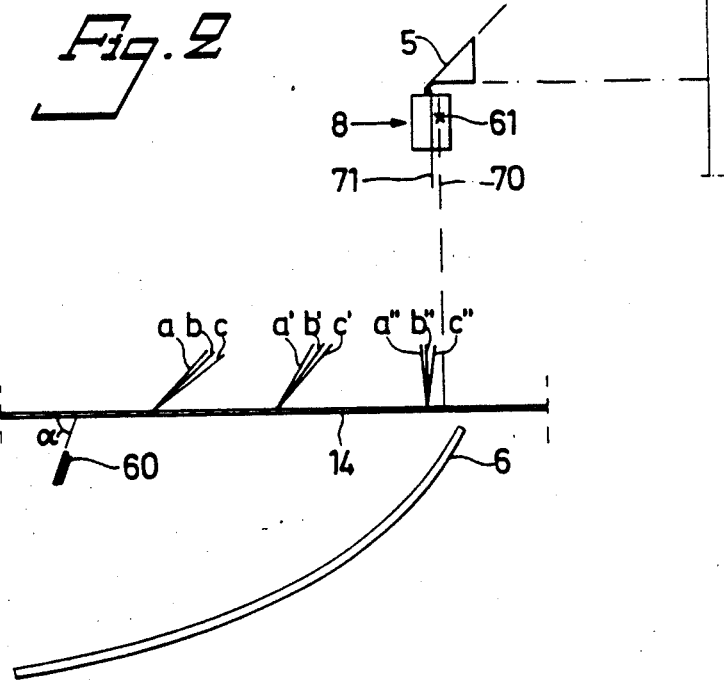

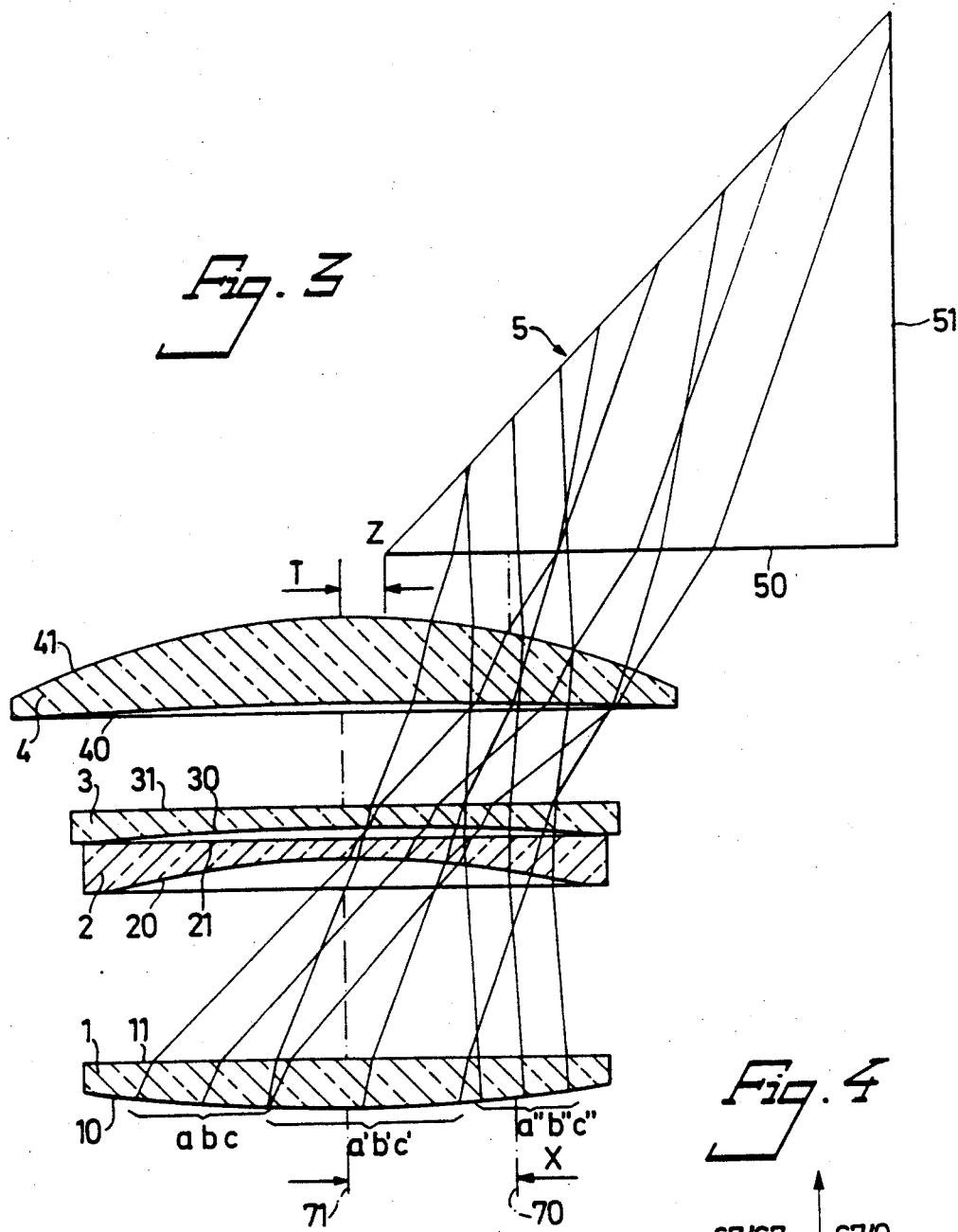
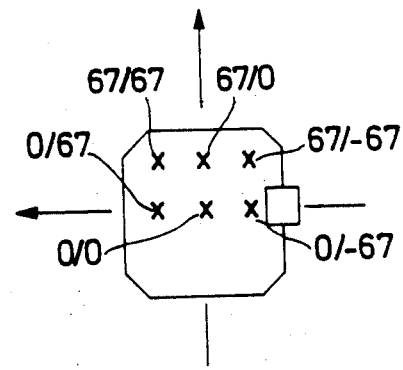

0/-67

67/-67

0/0

PROJECTION LENS

FIELD OF THE INVENTION

The present invention relates to a projection lens comprising four coaxial lens units. The invention also relates to the use of the lens specially placed in a certain type of projector.

The projection lens according to the invention is particularly, but not exclusively, useful in overhead projectors.

Overhead projectors have long been used, despite the drawbacks associated with conventional equipment.

Such drawbacks include the difficulty of obtaining projector constructions which, with a horizontal object plane, permit substantially undistorted reproduction of the picture on a vertical projection screen above a horizontal plane in which the projector lens is located. Partly due to this, there has been little incentive to use a lens with good optical performance which can also be produced at relatively low cost.

DESCRIPTION OF THE PRIOR ART

An overhead projector which eliminates the first drawback is revealed in EP A No. 0 277,469. Such an overhead projector, however, places high demands on the field angle of the objective lens and the problem is thus to produce an objective lens at low cost which will offer a field angle in the region of 45° and which can deal with astigmatism and field curvature problems, for instance.

It should be borne in mind that conventional projection lenses with acceptable values for astigmatism and field curvature, offer a field angle of at most 20°. This may be sufficient if the objective lens is placed centrally above the object surface in an overhead projector.

Conventional objective lenses usually comprise three lenses, each having two spherically curved surfaces. The cost of such an objective lens is determined to a great extent by the number of curved lens surfaces. The expert is also aware that objective lenses to solve specific problems, including those outlined here, can be constructed by increasing the number of lens elements and thus the number of curved surfaces. However, such a solution is in opposition to the desire to reduce manufacturing costs.

SUMMARY OF THE INVENTION

One object of the present invention is to achieve a projection lens with acceptable values with regard to astigmatism and field curvature and which enables a field angle approaching 40-45° when specially placed in a certain type of overhead projector, as will be described in the following. However, it should be obvious that the projection lens claimed offers good performance in general use in projection systems, but that its performance is particularly excellent in certain special projector systems and with a special placing which will be described in more detail in the following.

The projection lens according to the invention comprises four coaxial lenses of which, in the direction from the object side to the picture side, the first lens has a convex surface facing the object side, the second lens and the third lens are located close together and spaced from the first lens and the fourth lens, and the fourth lens has a convex surface facing the picture side, characterised in that the surface of the first lens facing the picture side is planar, that the surfaces of the second and third lenses facing the picture side are planar, that the surfaces of the second and third lenses facing the object side are concave and that the surface of the fourth lens facing the object side is planar or preferably slightly convex.

A projection lens should suitably be designed to allow adjustment for varying projection distances and for this reason the projection lens according to the invention is characterised in that the first, second and third lenses are fixed in relation to each other to form a group of lenses, and that this group of lenses is axially movable in relation to the fourth lens to enable variation of the focal length of the lens.

The lens according to the invention is suitably located eccentrically in relation to the optical axis of a projector, preferably an overhead projector, in which the objective lens is located in the region above the edge of an object window and in focus of an elliptical mirror illuminating the object window, in the other focus of which a light source is located, the objective lens thus being eccentric from said adjacent mirror focus in the direction of the central axis of the object window. Such an eccentric position for the objective lens produces a field angle approaching about 45°.

It has been found, however, that the objective lens itself can also be used in more conventional projectors with excellent results, e.g. in projectors where the objective lens is centered in relation to the object plate. However, in more conventional applications there is usually no need for extreme field angles.

The invention thus offers an objective lens which admittedly has four lens elements, but still has fewer curved surfaces and offers a considerably wider field angle than a conventional triple-lens overhead projector lens system with a field angle of about 20°.

An important feature of the invention is thus that it can be used with large field angles while still maintaining relatively high demands for picture quality, as will be explained in the following. Furthermore, this is possible at remarkably low cost considering that the lens includes four lens elements.

BRIEF DESCRIPTION OF THE DRAWINGS

The invention will be described by way of example in the following, with reference to the accompanying drawings.

FIG. 1 shows schematically an axial section through an objective lens according to the invention, the lefthand and righthand halves of FIG. 1 showing the lens in two schematically indicated end positions of its focus, FIG. 2 shows schematically a lateral view of the claimed objective lens as used in a type of overhead projector known per se, FIG. 3 shows schematically the ray path through the lens according to the invention, as used in the projector according to FIG. 2, FIG. 4 shows schematically a number of points which indicated coordinates whereby the points of the picture are normalized to a picture width of 200 mm.

DESCRIPTION OF THE PREFERRED EMBODIMENTS

Figure 5:
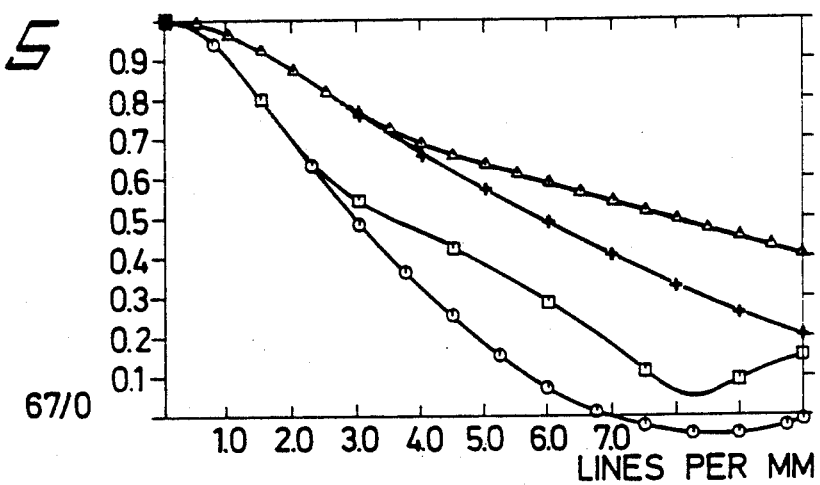
FIGS. 5-10 show the modulation in the points of the picture marked in FIG. 4 for the claimed objective lens, as used in accordance with FIGS. 2 and 3.

Referring now to the lefthand side of FIG. 1, it can be seen that the objective lens comprises four lens elements 1-4, of which lens 1 is intended to face the surface of the object and the lens is intended to be located closest to the projector screen. It will be observed that the surface 10 of the lens 1 facing the object side has positive curvature and that the other surface 11 of the lens 1 is planar. It will also be observed that the lens 2 has a concave surface 20 facing the object side and that the opposite surface 21 of the lens 2 is planar. Furthermore, the lens 3 has a concave surface 30 facing the object side and the opposite surface 31 of the lens 3 is planar.

The lenses 1, 2 and 3 are fixed in relation to each other by means of a lens mounting 81.

The lens 4 is supported by a lens mounting 82 and has a surface 40 facing the object side, which may be planar but preferably has a slightly negative curvature. The lens mounting 82 is arranged axially displaceable in relation to the lens mounting 81, but the lenses 1-4 remain coaxial. It can thus be seen that the distance between the surfaces 40 and 31 can be varied in order to vary the focal length of the projection lens.

An example of the objective (together with a deflection prism is defined in the tables 1-4 on the appended table sheets.

The grades of glass stated in table 1 are commercially available from Schott AG, West Germany.

The objective according to the invention can be used with advantage in a projector of the type sketched in FIG. 2. Such a projector is known per se from EP A No. 0 277 469. A projector of such a type comprises substantially a horizontal table with an object window 14 for large-size transparencies. The objective lens 8 is located substantially immediately above the righthand edge of the object window 14. Below the window 14 is an ellipsoid mirror 6 (or a plurality of combined ellipsoid mirrors) having one focal point 61 at the objective lens 8 and its other focal point in a light source 60 suitably located below the surface of the table so that it does not directly illuminate the objective. The main surface of the light source filament 60 is directed towards the ellipsoid mirror 6 and forms an angle $\alpha$ of about 70-90° to the table/horizontal plane. As shown in FIG. 2, the objective lens 8 is suitably eccentric in the illustrated plane so that the axis 71 of the lens 8 lies slightly to the left of the line 70 which is a normal to the surface 14, joins its righthand edge and includes the focal point 61. In the example according to table 1, the distance between axes 70 and 71 is about 14 mm, but obviously this eccentric distance can perfectly well lie within the interval 10-16 mm for this example.

It was previously considered impossible in the type of projector shown in FIG. 2, to place the axis 71 of the lens 8 to the right of the normal 70 to the surface 14 through the righthand edge of the picture surface. It has now been found that this previous limit was perhaps more dependent on the construction of the lens than on the structure of the apparatus otherwise, and that it therefore might be at least theoretically possible to place an objective lens close to the normal line 70 if an objective with perhaps five lenses were to be used, in which case the focal point could possibly be located immediately to the right of the line 70.

It should be remembered that this type of projector as such is intended to offer projection of an object lying on the horizontal picture window 14, on a vertical screen 15, without any distortion of the picture format, which means that the lower edge of the light leaving the deflection prism 5 shall be horizontal.

FIG. 2 also shows rays a b c, a' b' c' and a" b" c", at the rear part, the center and the front part of the object window 14 and the path of these rays is shown in FIG. 3, which illustrates the objective lens according to the invention, together with a deflection prisma.

It can be seen from the rays a b c, a' b' c' and a" b" c" that an eccentric placing of the object offers a large field angle therefor. It can also be seen that a relatively small prism 5 or the like is sufficient to deflect the light projected through the objective.

The prism 5 is shown on the same scale as the objective 8 in FIG. 3.

Referring to table 1 it can be seen that the surface 50 of the prism 5 is located 5 mm above the center of the lens surface 41. It can also be seen that the lefthand corner of the prism 5 in FIG. 3 may be located a distance T amounting to, e.g. 3.5 mm, to the right of the objective axis 71 without essentially any light being lost. The prism 5 may suitably be pivotable about a horizontal axis Z at its lefthand corner edge in FIG. 3, in order to permit compensation for the screen 15 deviating from the vertical plane, for instance.

FIG. 3 also shows the eccentric distance X between the plane 70 and the objective axis 71. As mentioned, X may be within the interval 10-16 mm and in the example shown it is about 14 mm.

In the example according to table 1 the edge of the prism 5 may be 43 mm in length along the sides 50 and 51, in which case T will be approximately 3.5 mm.

The objective according to the invention in the embodiment according to tables 1-4, applied in a projector according to FIGS. 2 and 3 has been investigated with respect to modulation in a number of revealing points on the picture. These points are normalized to the picture width of 200 mm and the points selected are indicated both by the coordinates and by their positions in a schematic, horizontal view seen from above the projector according to FIG. 2.

Figure 6:
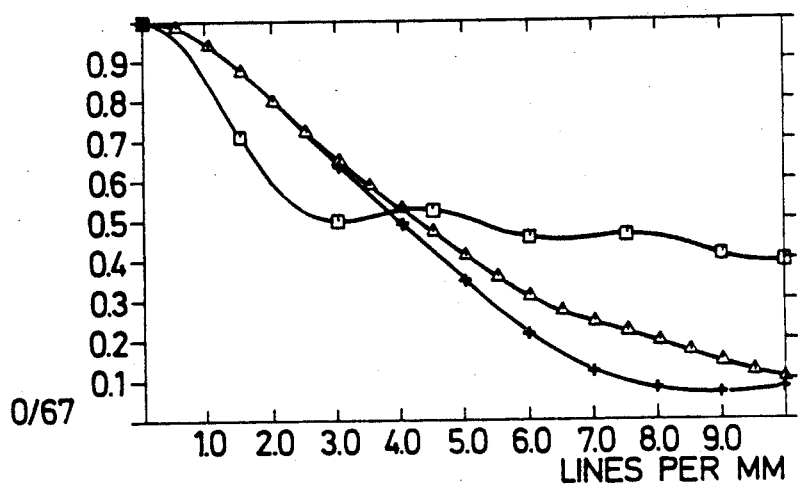
Figure 7:
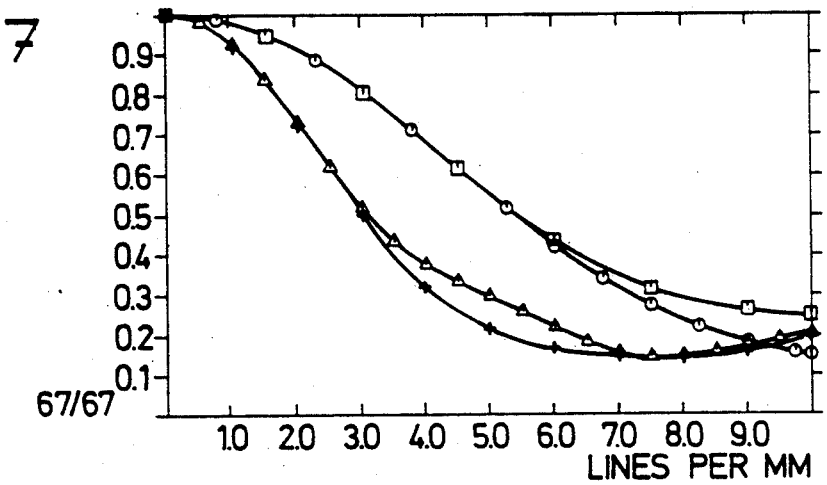
Figure 8:
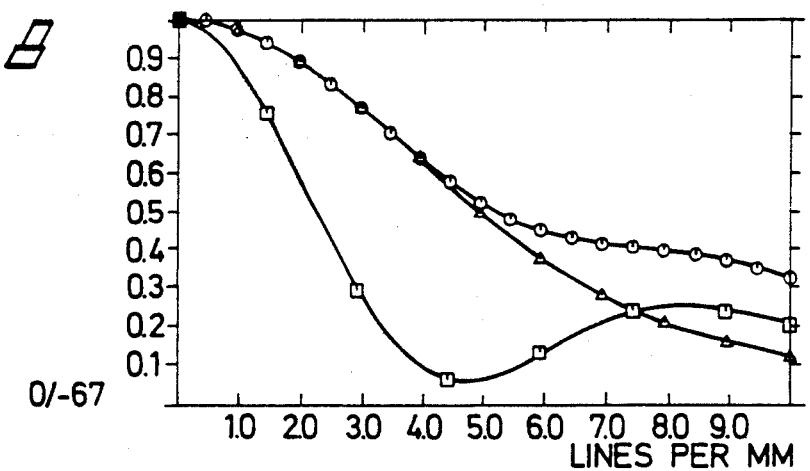
Figure 9:
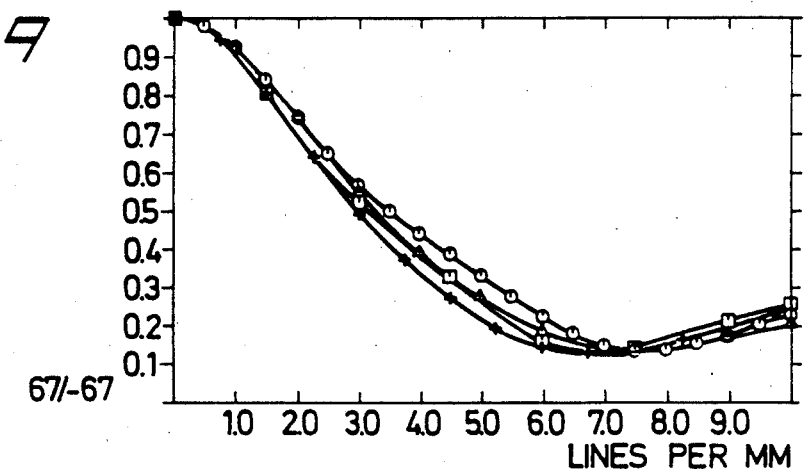
Figure 10:
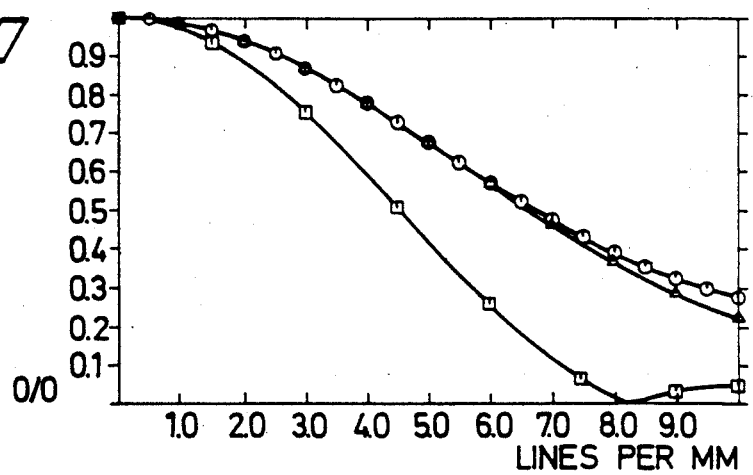

FIGS. 5-10 thus show the modulation at these points.

The side of the picture projected is 1400×1400 mm, normalized to the size of the picture window, 285×285 mm. The light source in the projector is a polychromatic light source having a size of 7×7 mm and the filament incline $\alpha$ is 70°.

Each of the FIGS. 5-10 shows in principle four curves, i.e. MTF (Modulation Transfer Function) at an orientation angle 0 and 90°, respectively, and the real portion of OFT (Optical Transfer Function) at an orientation angle of 0 and 90°, respectively. OTF is more extensive than MTF and also includes phase shifting; MTF is the argument of OTF.

The curves are marked as follows:

□ MTF 0°
◯ MTF 90°
△ Real Portion of OTF 0°
+ Real Portion of OTF 90°

Certain curves are omitted in some of the figures but an expert will understand that, for reasons of symmetry, the omitted curves substantially coincide with those shown.

The proposed eccentric placing of the objective in relation to the focal point offers a relatively large field angle with acceptable aberration values. However, the lens surfaces must have slight curvature, the number of curved lens surfaces suitably being low as in the objective illustrated here.

TABLE 1

| Lens component No. | Surface No. | Distance thickness mm | Radius mm | Material | Optically required semi-aperture mm |
|---|---|---|---|---|---|
| | 14 | (object plane) 318,686$^{+0,25}_{-5,50}$ | ∞ | air | |
| 1 | 10 | 3,900 | 146,2070 | glass SF2 | 23,0 |
| | 11 | 16,394 | ∞ | air | 22,3 |
| 2 | 20 | 1,600 | −81,0500 | glass SF4 | 20,0 |
| | 21 | 0,950 | ∞ | air | 21,4 |
| 3 | 30 | 1,700 | −271,2650 | glass BASF2 | 22,68 |
| | 31 | (variable ca 2,5-9) | ∞ | air | 24,0 |
| 4 | 40 | 6,971 | −501,9040 | glass LAF2 | 28,0 |
| | 41 | 5,000 | −66,9940 | air | 28,8 |
| 5 | 50 | 43 | ∞ (prisma) | glass F2 | |
| | 51 | (see table 2) | ∞ | air | |
| | 15 | screen | | | |

TABLE 2

| Distance between surface 14 and 10 | Distance between surface 31 and 40 | Focal distance from surface 51 to surface 15 | Picture size |
|---|---|---|---|
| 313,186 | 8,40 | 1276 | 1000 × 1000 |
| 318,686 | 5,89 | 1722 | 1400 × 1400 |
| 318,936 | 2,65 | 3613 | 3000 × 3000 |

TABLE 3

| | Spectral weights | | | | |
|---|---|---|---|---|---|
| | Wavelength nm | | | | |
| Type of weight | 570,0 | 495,0 | 635,0 | 525,0 | 605,0 |
| Photopic | 0,95200 | 0,25975 | 0,21675 | 0,79288 | 0,56725 |
| Planck | 0,76493 | 0,46859 | 1,00000 | 0,58679 | 0,89639 |
| Resultant weights | 0,72821 | 0,12172 | 0,21675 | 0,46525 | 0,50848 |

TABLE 4

| | Refractive index data | | | | |
|---|---|---|---|---|---|
| Lens component | Wavelength nm | | | | |
| No. | 570,0 | 495,0 | 635,0 | 525,0 | 605,0 |
| 1 | 1,649475 | 1,659657 | 1,643627 | 1,654991 | 1,646077 |
| 2 | 1,757745 | 1,772392 | 1,749450 | 1,765650 | 1,752914 |
| 3 | 1,666192 | 1,676051 | 1,660516 | 1,671537 | 1,662896 |
| 4 | 1,745564 | 1,754335 | 1,740415 | 1,750345 | 1,742583 |
| 5 | 1,621635 | 1,630687 | 1,616405 | 1,626547 | 1,618600 |

I claim:

1. A projection lens comprising four coaxial lenses (1–4) each with a spherically curved surface of which, int he direction from the object side (14) to the picture side (15), the first lens (1) has a convex surface (10) facing the object side, the second lens (2) and the third lens (3) are located close together and spaced from the first lens (1) and the fourth lens (4), and the fourth lens (4) has a convex surface (41) facing the picture side, wherein the surface (11) of the first lens (1) facing the picture side is planar, and the surfaces (21, 31) of the second (2) and third (3) lenses facing the picture side are planar, the surfaces (20, 30) of the second (2) and third (3) lenses facing the object side are concave and the surface (40) of the fourth lens (4) facing the object side is planar or slightly convex.

2. A projection lens system comprising four coaxial lenses (1–4) each with a spherically curved surface of which, in the direction from the object side to the picture side, the first lens (1) has a convex surface (10) facing the object side, the second lens (2) and the third lens (3) are located close together and spaced from the first lens (1) and the fourth lens (4), and the fourth lens (4) has a convex surface (41) facing the picture side, wherein the surface (11) of the first lens (1) facing the picture side is planar, and the surfaces (21, 31) of the second (2) and third (3) lenses facing the picture side are planar, the surfaces (20, 30) of the second (2) and third (3) lenses facing the object side are concave and the surface (40) of the fourth lens (4) facing the object side is planar or slightly convex and, wherein the first (1), second (2) and third (3) lenses are fixed in relation to each other by means of a first lens mounting which is axially movable in relation to the fourth lens (4) to enable variation of the focal length of the lens system.

3. A projection lens system comprising four coaxial lenses (1-4) each with a spherically curved surface of which, in the direction from the object side to the picture side, the first lens (1) has a convex surface (10) facing the object side, the second lens (2) and the third lens (3) are located close together and spaced from the first lens (1) and the fourth lens (4), and the fourth lens (4) has a convex surface (41) facing the picture side, wherein the surface (11) of the first lens (1) facing the picture side is planar, and the surfaces (21, 31) of the second (2) and third (3) lenses facing the picture side are planar, the surfaces (20, 30) of the second (2) and third (3) lenses facing the object side are concave and the surface (40) of the fourth lens (4) facing the object side is planar or slightly convex and, wherein tion and having a second focus point (61) on the optical axis (70), a light source (60) positioned at the first focus point, a lens system having four coaxial lenses (1-4) positioned with respect to the optical axis such that the second focus point lies within the lens system and the axis defined by the four coaxial lenses (1-4) of the lens system is spaced from the optical axis (70) of the projector, each lens having a spherically curved surface of which, in the direction from the side facing the object window to the picture side, the first lens (1) has a convex surface (10) facing the object window, the second lens (2) and the third lens (3) are located close together and spaced from the first lens (1) and the fourth lens (4), and the fourth lens (4) has a convex surface (41) facing the picture side, wherein the surface (11) of the first lens (1) facing the picture side is planar, and the surfaces (21, 31) of the second (2) and third (3) lenses facing the picture side are planar, the surfaces (20, 30) of the second (2) and third (3) lenses facing the window side are concave and the surface (40) of the fourth lens (4) facing

| Lens Component Number | Surface Number | Distance/ thickness mm | Radius mm | Material | Optically required semiaperture mm |
|---|---|---|---|---|---|
| | 14 | (object plane) $318{,}686^{+0.25}_{-5{,}50}$ | | air | |
| 1 | 10 | 3,900 | 146,2070 | glass SF2 | 23,0 |
| | 11 | | | | 22,3 |
| | | 16,394 | | air | |
| 2 | 20 | 1,600 | −81,0500 | glass SF4 | 20,0 |
| | 21 | | | | 21,4 |
| | | 0,950 | | air | |
| 3 | 30 | 1,700 | −271,2650 | glass BASF2 | 22,68 |
| | 31 | | | | 24,0 |
| | | variable ca 2,5-9 | | air | |
| 4 | 40 | 6,971 | −501,9040 | glass LAF2 | 28,0 |
| | 41 | | −66,9940 | | 28,8 |

4. A projector which comprises a support having a planar object window (14) therein, the object window (14) having an edge, the projector having an optical axis (70) extending perpendicular from the edge of the object window (14) in the first direction, an elliptical mirror (6) spaced from the object window (14) in a second opposite direction, the mirror having one focus point spaced from the object window (14) in the second directhe object window is planar or slightly convex.

5. A projector as claimed in claim 4, wherein the first (1), second (2) and third (3) lenses are fixed in relation to each other by means of a first lens mounting (81) which is axially movable in relation to the fourth lens (4) to enable variation of the focal length of the lens system.

6. A projector as claim in claim 4, wherein

| Lens Component No. | Surface Number | Distance/ thickness mm | Radius mm | Material | Optically required semiaperture mm |
|---|---|---|---|---|---|
| | 14 | (object plane) $318{,}686^{+0.25}_{-5{,}50}$ | | air | |
| 1 | 10 | 3,900 | 146,2070 | glass SF2 | 23,0 |
| | 11 | | | | 22,3 |
| | | 16,394 | | air | |
| 2 | 20 | 1,600 | −81,0500 | glass SF4 | 20,0 |
| | 21 | | | | 21,4 |
| | | 0,950 | | air | |
| 3 | 30 | 1,700 | −271,2650 | glass BASF2 | 22,68 |
| | 31 | | | | 24,0 |
| | | variable ca 2,5-9 | | air | |
| 4 | 40 | 6,971 | −501,9040 | glass LAF2 | 28,0 |

-continued

| Lens Component No. | Surface Number | Distance/thickness mm | Radius mm | Material | Optically required semiaperture mm |
|---|---|---|---|---|---|
| | 41 | | −66.9940 | | 28.8 |

\* \* \* \* \*